United States Patent [19]
Englert

[11] Patent Number: 5,964,934
[45] Date of Patent: Oct. 12, 1999

[54] ACOUSTICAL TILE CONTAINING TREATED PERLITE

[75] Inventor: Mark H. Englert, Libertyville, Ill.

[73] Assignee: USG Interiors, Inc., Chicago, Ill.

[21] Appl. No.: 08/993,363

[22] Filed: Dec. 18, 1997

[51] Int. Cl.[6] .................................................... C09L 1/40
[52] U.S. Cl. .................. 106/287.1; 106/287.11; 106/287.15; 106/287.16; 106/DIG. 2
[58] Field of Search .................. 106/287.1, 287.11, 106/287.15, 287.16, DIG. 2

[56] References Cited

U.S. PATENT DOCUMENTS

| | | |
|---|---|---|
| 3,658,564 | 4/1972 | Gerow et al. . |
| 3,718,491 | 2/1973 | Yates . |
| 3,769,065 | 10/1973 | Dunn . |
| 3,886,076 | 5/1975 | Venable . |
| 3,933,514 | 1/1976 | Banks et al. . |
| 4,072,533 | 2/1978 | Barrall et al. . |
| 4,100,115 | 7/1978 | Baer . |
| 4,109,032 | 8/1978 | Barrall . |
| 4,128,524 | 12/1978 | Barnett et al. . |
| 4,175,159 | 11/1979 | Raleigh ................................... 428/405 |
| 4,231,884 | 11/1980 | Dorius . |
| 4,263,093 | 4/1981 | Shenk . |
| 4,288,253 | 9/1981 | Venable . |
| 4,304,704 | 12/1981 | Billings . |
| 4,313,997 | 2/1982 | Ruff et al. . |
| 4,425,449 | 1/1984 | Dorsey . |
| 4,446,040 | 5/1984 | Samanta . |
| 4,454,267 | 6/1984 | Williams . |
| 4,473,404 | 9/1984 | Eckardt et al. ........................... 106/84 |
| 4,525,388 | 6/1985 | Rehder et al. . |
| 4,657,594 | 4/1987 | Struss ........................................ 521/57 |
| 4,686,253 | 8/1987 | Struss et al. . |
| 4,698,257 | 10/1987 | Goll . |
| 4,814,013 | 3/1989 | Guzeev et al. . |
| 4,889,747 | 12/1989 | Wilson ................................... 427/221 |
| 4,911,788 | 3/1990 | Pittman et al. . |
| 4,963,603 | 10/1990 | Felegi et al. . |
| 5,035,804 | 7/1991 | Stowe . |
| 5,071,511 | 12/1991 | Pittman . |
| 5,134,179 | 7/1992 | Felegi et al. . |
| 5,277,762 | 1/1994 | Felegi et al. . |
| 5,336,318 | 8/1994 | Attard et al. . |
| 5,482,551 | 1/1996 | Morris et al. . |
| 5,539,028 | 7/1996 | Bednar et al. . |
| 5,542,358 | 8/1996 | Breslauer . |
| 5,558,710 | 9/1996 | Baig . |

FOREIGN PATENT DOCUMENTS

| | | |
|---|---|---|
| 53-072018 | 6/1978 | Japan . |
| 189724 | 1/1967 | U.S.S.R. . |
| 592793 | 3/1978 | U.S.S.R. . |
| 700482 | 11/1979 | U.S.S.R. . |
| 706371 | 12/1979 | U.S.S.R. . |
| 1221387 | 1/1963 | United Kingdom . |

*Primary Examiner*—David Brunsman
*Attorney, Agent, or Firm*—Donald E. Egan; David F. Janci; John M. Lorenzen

[57] ABSTRACT

A composition suitable for making acoustical tiles in a water-felting process comprises expanded perlite, cellulosic fiber, and, optionally, a secondary binder and mineral wool. The perlite has been treated to reduce its water retention.

20 Claims, No Drawings

ACOUSTICAL TILE CONTAINING TREATED PERLITE

This invention relates to compositions containing expanded perlite, which are useful in manufacturing acoustical tiles and panels for ceiling and other applications using a water felting process. More particularly, this invention relates to acoustical tile compositions, which include an expanded perlite treated to reduce its tendency to retain water, which can be efficiently fabricated into tiles and panels using conventional water felting processes and equipment. Still more particularly, this invention relates to acoustical tile compositions, which include an expanded perlite which is also treated to increase its wettability, which can be efficiently fabricated into ceiling tiles and panels using conventional water felting processes and equipment.

BACKGROUND OF THE INVENTION

The water felting of dilute aqueous dispersions of mineral wool and lightweight aggregate is a well-known commercial process for manufacturing acoustical ceiling tile. In this process, an aqueous slurry of mineral wool, lightweight aggregate, cellulosic fiber, binder and other ingredients, as desired or necessary, is flowed onto a moving foraminous support wire, such as that of a Fourdrinier or Oliver mat forming machine, for dewatering. The slurry may be first dewatered by gravity and then dewatered by vacuum suction means to form a basemat. The wet basemat is then pressed (with or without the application of additional vacuum) to the desired thickness between rolls and the support wire to remove additional water. The pressed basemat is then dried in heated drying ovens, and the dried material is cut to the desired dimensions and optionally sanded and/or top coated, such as with paint, to produce acoustical ceiling tiles and panels.

Mineral wool acoustical tiles are very porous which is necessary to provide good sound absorption. The prior art (e.g. U.S. Pat. Nos. 3,498,404; 5,013,405; 5,047,120 and 5,558,710) also discloses that mineral fillers, such as expanded perlite, may be incorporated into the composition to improve sound absorbing properties and to provide lightweight acoustical tiles and panels. When used in water felting processes, compositions containing expanded perlite require a high level of water to form a workable aqueous slurry. It has been found that conventional expanded perlite (e.g. perlite having a density of from about 3 to 5 pounds per cubic foot) holds and retains a very high level of water within its structure. Laboratory tests show that such conventional expanded perlite can retain as much as 10 times its weight in water. Perlite, treated in accordance with the present invention, retains much less water. Typically less than half of the normal amount of water is retained by the perlite particles. The use of an expanded perlite, treated in accordance with the present invention, allows the formation of a mat containing significantly less water. These factors allow the production of acoustical tiles on conventional equipment at higher speeds.

It is an object of this invention to provide an acoustical tile composition containing expanded perlite which may be more efficiently fabricated into acoustical tiles and panels in a water felting process wherein the conventional expanded perlite is treated to reduce the tendency of the perlite to retain water.

It is a further object of this invention to provide an acoustical tile composition containing expanded perlite which may be more efficiently fabricated into acoustical tiles and panels in a water felting process wherein the conventional expanded perlite is treated with a silicone compound to reduce the tendency of the perlite to retain water.

It is a still further object of this invention to provide an acoustical tile composition containing expanded perlite which may be more efficiently fabricated into acoustical tiles and panels in a water felting process wherein the conventional expanded perlite is treated with a silicone compound having at least some hydrophilic functionality. This hydrophilic functionality on a silicone compound provides a particle that does not retain water while maintaining a degree of wettability that permits the treated perlite to be mixed into the standard water-felted furnish. These and other objects will be apparent to persons skilled in the art in view of the description that follows.

SUMMARY OF THE INVENTION

The present invention relates to an acoustical tile composition containing expanded perlite that can be used in a water felting process to make ceiling tile. It has been discovered that it is advantageous to use an expanded perlite which has been treated to reduce its tendency to retain water in a composition containing expanded perlite, cellulosic fiber, and preferably a secondary binder such as starch. The composition of the present invention may also contain conventional materials such as mineral fiber and fillers such as clay, gypsum and limestone. Preferably the perlite is also treated to provide good wettability.

It has been discovered that such a composition containing treated perlite can be used to more efficiently manufacture acoustical ceiling tiles and panels in conventional water-felting equipment. It has been found that by using the treated perlite, rather than conventional untreated perlite, the acoustical tile composition of the present invention produces a basemat, which contains less water. The lower water level allows the basemat to dry quicker and allows the equipment to be run at higher line speeds. It has also been found that treated perlite which has some hydrophilic character provides more efficient manufacture of acoustical ceiling tiles and panels because it is easier to form a stable slurry with hydrophilic treated perlite than hydrophobic treated perlite. Accordingly, treated perlite having some hydrophilic character is preferred.

Although a variety of techniques may be used to treat the expanded perlite to reduce its tendency to retain water, it is generally preferred to treat the expanded perlite with a silicone compound to reduce its tendency to retain water. As used herein, the term "silicone compound" is intended to include not only conventional silicone polymers, but polymeric siloxanes, reactive silane monomers, siliconates (salts of silanes) and other organic silicon-containing materials which are effective to reduce the tendency of the expanded perlite to retain water.

The acoustical tile compositions of the present invention contain cellulosic fiber that may comprise waste newsprint and/or waste (scrap) acoustical tiles and panels, which are environmentally friendly. The acoustical tile compositions may also contain a reduced amount of mineral wool or may contain no mineral wool. The dried product can be formed into tiles or panels having acoustical properties comparable to those of commercially available acoustical tiles. The acoustical tiles made from the compositions of this invention have acceptable physical properties for use in suspended ceiling systems.

DETAILED DESCRIPTION OF THE INVENTION

The present invention relates to an acoustical tile composition containing expanded perlite that can be used in a water felting process to make ceiling tile. The water felting process to which the present invention pertains comprehends the formation of an aqueous dispersion comprising expanded perlite, cellulose fiber and preferably a secondary binder such as starch with sufficient water to make the dispersion to be flowable. The aqueous dispersion is flowed onto a moving foraminous support wire where it forms a cake, which is dewatered through a combination of gravity and vacuum dewatering. The dewatered cake is then pressed (with or without the application of additional vacuum) to a given thickness to form a basemat. The pressing step (with or without the application of additional vacuum) further dewaters the basemat. The basemat is then passed into a drying kiln in which the moisture in the basemat is reduced to less than 5% and preferably less than 1% in the final product.

The acoustical tile compositions of this invention must include expanded perlite and cellulosic fiber and preferably also include a secondary binder such as starch. The expanded perlite used in the composition of the present invention must be treated to reduce its tendency to retain water. In the preferred embodiment, the composition of the present invention may additionally include mineral fiber and clay filler. The present invention is not limited to any precise amounts of materials. Those skilled in the art will recognize that the maximum benefits of the present invention are achieved by compositions that include the maximum amount of perlite, provided the required physical properties of the product are maintained. In general, the present invention contemplates compositions containing the following components in the amounts shown in Table 1.

TABLE 1

| Ingredient | Weight Percent (Useable Range) | Weight Percent (Preferred Range) | Preferred Percentage |
| --- | --- | --- | --- |
| Perlite | Up to 75% | 15 to 70% | 50% |
| Cellulosic Fiber | Up to 25% | 3 to 20% | 18% |
| Starch | 0 to 15% | 3 to 12% | 7% |
| Latex | 0 to 10% | 0 to 5% | 0% |
| Filler | 0 to 25% | 0 to 20% | 20% |
| Mineral Fiber | 0 to 85% | 5 to 65% | 5% |
| Total | | | 100% |

The acoustical tile compositions of the present invention are based on substituting a treated expanded perlite having a reduced tendency to retain water for the conventional expanded perlite. The composition must also contain cellulosic fiber and preferably contains at least one other binder comprising starch or latex. The composition preferably contains mineral wool and filler such as clay. The composition may also contain other additives, such as flocculants, coagulants and surfactants, normally included in acoustical ceiling tile formulations. As noted above, the composition may contain some mineral wool (in reduced amount), however, it has been found that the compositions of this invention can be used to make mineral wool-free acoustical tiles and panels.

The acoustical tile compositions of the present invention are based on using an expanded perlite that has been treated to reduce its tendency to retain water. It has been found that using the treated perlite rather than untreated perlite provides the advantage of providing a basemat that has a significantly reduced level of water such that the basemat can be dried with less energy. The formation of a basemat having a lower water content through the use of treated perlite enables the product to be dried faster and allows the entire water felting line to be run at higher speed.

It has been found that the water in the acoustical ceiling tile dispersion is present essentially in two modes, namely as "free" water and as "bound" water (also referred to as imbibed water or capillary water). Free water is defined as water which can be removed mechanically from the furnish, including drainage through the wire, with and without vacuum, and through the press section of the machine. Bound water is defined as water bound to cellulose fibers and other components of the solids fraction either by hydrogen bonding or capillary effects which cannot be removed mechanically (i.e., by suction or pressing). This bound water which is present in the basemat requires heat to remove it and must therefore be removed in the dryer. The water retention value (WRV) is defined as the weight of bound water as a percentage of the dry weight of the sample.

The water present in the formed basemat (i.e., after vacuum dewatering and pressing) is predominantly bound water. Of this bound water, it has been determined that water retained within the pores of the perlite particles constitutes approximately 66% of the total bound water in a ceiling tile basemat comprising 45% mineral wool, 32% perlite, 5% starch and 18% paper fiber. This value increases to approximately 83% for a ceiling tile basemat comprising 5% mineral wool, 50% perlite, 7% starch, 18% paper fiber and 20% gypsum. Paper fiber represents the second largest contributor to bound water retaining 17% and 13% water, respectively, in the above two formulas.

In addition to the essential expanded, treated perlite, cellulosic fiber and preferred starch binder, the composition of the present invention may also contain other binders such as latex, and fillers such as clay, gypsum and limestone, as well as other conventional additives, including flocculants and surfactants, normally included in acoustical ceiling tile formulations. As noted above, the composition may contain some mineral wool (in reduced amount), however, it has been found that the compositions of this invention can be used to make mineral wool-free acoustical tiles and panels.

The first key ingredient in the novel acoustical tile composition of this Invention is an expanded perlite. It is well known in the art to use expanded perlite in acoustical tile compositions. Expanded perlites, and other lightweight aggregate materials, have been used in acoustical tile because of their low cost and low density (e.g. 3 to 5 pounds per cubic foot). The expanded perlite provides bulking, and porosity in the composition that enhances acoustical properties. It has been found that a low density (i.e., 3–5 pcf) expanded perlite provides sufficient bulking and porosity. In the present invention the expanded perlite has been treated to reduce the level of water retained by the perlite.

Perlite generally comprises any glass rock with the capacity to expand greatly on heating, similar to obsidian, and particularly comprises volcanic glass of rhyolitic composition. Perlite generally contains 65–75% $SiO_2$, 10–20% $Al_2O_3$, 2–5% $H_2O$, and smaller amounts of soda, potash, and lime. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional method of preparing expanded perlite, the perlite ore is first ground to a fine size. The perlite is expanded by introducing the finely ground perlite ore into the heated air of a perlite expander. Typically the expander heats the air to about 1750° F. The finely ground perlite is carried by the heated air which heats the perlite and causes it to pop like popcorn to form the expanded perlite having a density of about 3 to 5 pounds per cubic foot. Expanded perlite is a very lightweight material, but it contains many fine cracks and fissures. When expanded perlite is placed in contact with water, the water penetrates the cracks and fissures and enters into the air filled cavities of the perlite, thereby causing the perlite to retain a very large amount of water within the expanded perlite particles.

The present invention contemplates treating the expanded perlite to reduce the amount of water retained by the perlite when the perlite is mixed with water to form an aqueous slurry. It has been found that treatment of the perlite with a silicone compound reduces the tendency of water to penetrate the cracks and fissures and thus diminishes the water retention of the perlite. The water retention value is generally reduced in relation to the amount of silicone compound applied to the perlite.

As used herein, the term "silicone compound" is intended to include not only conventional silicone polymers, but polymeric siloxanes, reactive silane monomers, siliconates (salts of silanes) and other organic silicon-containing materials which are effective to reduce the tendency of the expanded perlite to retain water. Among the silicone compounds that may be utilized to treat the expanded perlite in order to reduce the amount of water retained by the perlite are various siloxanes such as polydimethylsiloxane (PDMS), silanes such as isooctyltrimethoxysilane, and combinations thereof. The organoalkoxysilanes are the preferred reactive silanes because they may be converted to siloxanes on the surface of the perlite, without the production of corrosive by-products, and thus produce a silicone film in situ.

In the preferred embodiment, the expanded perlite is treated with a silicone compound which has both hydrophobic characteristics and hydrophilic characteristics in order to produce a perlite which has a reduced tendency to retain water but which can be easily mixed with water to form a flowable slurry for use in a water felting process.

The preferred siloxane materials utilize a polydimethylsiloxane backbone with hydrophilic sidechains. These materials include amino substituted polydimethylsiloxanes, such as DC 108 by Dow Corning and OSi ALE-56 by OSi Inc., and polydimethylsiloxanes with polyether sidechains such as TEGOPREN 5830 and TEGOPREN 5863 from Goldschmidt Chemical.

The preferred silane materials consist of combinations of hydrophobic and hydrophilic silanes. The hydrophobic silanes provide the required water resistance while the hydrophilic silanes provides the required hydrophilic character. Hydrophobic silane materials include isooctyltrimethoxysilane such as BS 1316 from Wacker Silicones and methyltrimethoxysilane such as OSi A-162 from OSi. Hydrophilic silane materials include amino functional trialkoxysilanes such as Dow Corning Z-6011 and Dow Corning Z-6020. Other hydrophilic silane materials include 3-glycidoxypropyltrimethoxysilane such as Dow Corning Z-6040 and chloropropyltriethoxysilane such as Dow Corning Z-6076. Typically, a mixture of a hydrophobic silane and a hydrophilic silane are used in combination to provide the required properties. Other usable silicone-type materials are illustrated in the examples that follow.

The present invention contemplates treating expanded perlite with a silicone compound to reduce its water retention value independent of the perlite density and size.

The present invention also contemplates the use of certain lightweight aggregates which are made up of closed cell microspheres which may be used in place of some or all of the treated perlite, described above. Suitable closed cell microsphere materials include the glass Microsphere products sold by 3M, Q-Cell products sold by Philadelphia Quartz, Dicaperl™ perlite materials from Grefco Corp. and Sil-Cell™ perlite materials from Silbrico. Because these materials are predominantly closed cell structures, they have relatively low water retention values, even without treatment with silicone compounds. Treatment of these microsphere materials with an appropriate silicone compound does, however, reduce their water retention values significantly.

One process for treating the perlite that has been found highly suitable is to produce an aqueous emulsion of the silicone and spray it onto the heated perlite as it comes from the furnace. The water in the water emulsion then is evaporated and the silicone is cured onto the perlite. An alternate method is described in Example 1, below. Another process for treating the perlite is to spray the silicone compound (whether siloxane or silane) directly onto the perlite.

The perlite ore used in the Examples reported below was purchased from Harborlite Corporation of Antonito, Colo. and expanded in the commercial expansion facilities of USG Corporation. Perlite ore from different sources, including the USG deposit at Lovelock, Nev., have been evaluated. No difference was noted during the perlite expansion or the basemat formation due to the characteristics of the perlite ore. The size of the expanded perlite particles is not critical and it is not deemed to be necessary to use a particularly fine perlite size. Expanded perlite having the following screen analysis may be used:

TABLE 2

| Standard Sieve | Percent |
| --- | --- |
| +30 | Trace |
| −30 to +50 | 0–10% |
| −50 to +100 | 59%–100% |
| −100 to +200 | 90%–100% |
| −200 | 10% Maximum |

The second essential ingredient in the novel acoustical tile compositions of this invention is the cellulosic fiber, which serves as a bulking agent and provides green strength. The cellulose fiber may also function as a binder and to retain fines. Several types of cellulosic fiber have been evaluated in these compositions. It is well known to use newsprint in acoustical tile formulations, and both hammer-milled and hydro-pulped newsprint have been evaluated in these compositions. Newsprint is preferred because of price considerations. Refined paper fibers and wood fiber may also be used as the source of the cellulosic fiber, however, it has been found that ceiling tiles made with wood fiber, either softwood or hardwood, are more difficult to cut with a knife at the installation site. Furthermore, wood fibers are a more expensive source of the cellulosic fiber.

The third principal ingredient is the binder component, which is an essential component. Although the cellulose fibers may provide sufficient adhesion to function as the sole source of binder, it is preferred to also include a secondary binder, such as starch, in the composition. Other secondary binders such as latex may be used with or without the starch if desired. Starch is the most cost efficient and is the preferred binder. It is well known to use starch as a binder in mineral wool-based acoustical tiles. A starch gel may be prepared by dispersing starch particles in water and heating the slurry until the starch is fully cooked and the slurry thickens to a viscous gel. A portion of the cellulosic fibers may be incorporated into the starch slurry prior to cooking. The cooking temperature of the starch slurry should be closely monitored to assure full swelling of the starch granules. A representative cooking temperature for cornstarch is about 180° F. (82° C.) to about 195° F. (90° C.). Starch may also be used as a binder without pre-cooking the starch, because it forms a gel during the process of drying the basemat.

A latex binder may be used in place of the starch or the latex may be used in combination with the starch and cellulose fiber binder. Many of the latex binders useful in acoustical ceiling formulations are disclosed in U.S. Pat. No. 5,250,153. As set forth therein, one of the problems with acoustical panels employing a starch binder is excessive sag, especially in high humidity conditions. It is well known in the art to use thermoplastic binders (latexes) in acoustical tiles based on mineral wool. These latex binders may have a glass transition temperature ranging from about 30° C. to about 110° C. Examples of latex binders include polyvinyl acetate, vinyl acetate/acrylic emulsion, vinylidene chloride, polyvinyl chloride, styrene/acrylic copolymer and carboxylated styrene/butadiene. The ceiling tile of the present invention may be made without starch or latex, but preferably at least one of them is present. In the preferred embodiment, the composition includes both cellulose fibers and starch.

An optional ingredient, which also is not novel in acoustical compositions, is clay. It is deemed essential to use at least 4% and preferably at least 10% by weight of clay in the ceiling tile formulation when it is desired to impart fire resistance (as defined by ASTM Test No E 119) because the clay sinters during the fire endurance test. In the Examples that follow, a commercially available Ball Clay from Gleason, Tenn. was used. Other clays that have been used include CTS-1 from KT Clay of Sledge, Miss., CTS-2 from KT Clay of Sledge, Miss., Spinks Clay from Gleason, Tenn. and Old Hickory Clay from Hickory, Ky. Other commercial clays such as Kaolin and Bentonite etc. can be used in the ceiling tile formulation.

In addition, the acoustical compositions of this invention may also contain mineral wool of the type conventionally used in acoustical tiles, inorganic fillers such as mica, wollastonite, silica, gypsum, stucco and calcium carbonate, other lightweight aggregates, surfactants and flocculants. These ingredients are well known to those skilled in the art of the preparation of acoustical tile compositions.

EXAMPLES

The following examples will serve to illustrate the preparation of several acoustical tile compositions within the scope of the present invention. It is understood that these examples are set forth for illustrative purposes and that many other compositions are within the scope of the present invention. Those skilled in the art will recognize that similar acoustical tile compositions may be prepared containing other quantities of materials and equivalent species of materials than those illustrated below.

Example 1

Samples of Silbrico 30-1 perlite, having a density of approximately 7 to 8 pounds per cubic foot, were treated with the Silicone-type materials listed below in Table 3, using the following procedure:

Laboratory Preparation of a Silicone Treated Perlite

1. Charge cement mixer with selected perlite
2. Add emulsion of Silicone to an airless sprayer.
3. Tare sprayer.
4. Start cement mixer and spray silicone emulsion onto the perlite through the mouth of the cement mixer.
5. Monitor weight of airless sprayer to determine the amount of silicone emulsion deposited onto the perlite. Target amount was 0.5% (based on active silicone fluid),
6. Transfer treated perlite to a large 5 liter Nalgene beaker and place beaker in a convection oven at 105° C.
7. Heat at 105° C. for approximately 24 hours.

The silicone treated perlite samples were tested to determine the water retention value (WRV), using the following procedure:

Determination of Water Retention Value for Perlite

1. Prepare a perlite/water slurry at a know consistency of 4.0%.
2. Allow to sit for 30 minutes after initial stirring.
3. Pre-weigh a #40 Whatman 9 cm filter paper.
4. Pre-weigh a 600 ml glass beaker.
5. Collect a 250 ml sample of stock, weigh and add to 9 cm Buchner funnel containing pre-weighed filter paper.
6. Apply 20" Hg vacuum for 15 seconds.
7. Shut off vacuum, transfer wet pad to a beaker of known weight and weigh wet pad and beaker.
8. Dry to constant weight in a 105° C. oven.
9. Weigh oven dried pad and beaker. Calculate moisture content of wet pad.
10. Repeat 5 times.

Water Retention Value (WRV) Is determined as:

$$WRV = (\text{weight of wet pad}) - (\text{weight retained by filter}) - (\text{oven dry pad weight}) / (\text{oven dry pad weight})$$

The WRV for the untreated control perlite and selected silicone treated perlites are presented in Table 3. All of the silicone treated perlites had significantly reduced WRV values. The perlite treated with the Dow Corning 108 siloxane (an amino substituted polydimethylsiloxane) mixed into water much more readily than either of the polydimethylsiloxanes (i.e., Dow Corning 1107 and 3563 products).

TABLE 3

| SILICONE TRADENAME | SILICONE TYPE | WRV (%) |
| --- | --- | --- |
| None | Untreated Silbrico 30-1 perlite | 742 |
| DC 1107 | Polyhydrogenmethylsiloxane | 182 |
| DC Q1-3563 | OH-endcapped polydimethylsiloxane | 134 |
| DC 108 | Aminosubstituted polydimethylsiloxane | 177 |

Example 2

Samples of Silbrico 3S perlite, having a density of approximately 3 to 4 pounds per cubic foot, were treated with various amino functional siloxane materials listed below in Table 4, using the procedure described in Example 1. The silicone treated perlite samples were tested to determine the water retention value (WRV), using the procedure described in Example 1. The WRV values for the untreated control perlite and the silicone treated perlites are reported below in Table 4.

TABLE 4

| SILICONE TRADENAME | SILICONE TYPE | WRV (%) |
| --- | --- | --- |
| None | Untreated Silbrico 3S Control | 702 |
| DC 108 | Amino functional polydimethyl siloxane | 383 |
| OSi ALE-56 | Amino modified polydimethyl siloxane | 391 |
| Genesee GP-134 | Amino functional polydimethylsiloxane with 46:1 ratio Me$_2$SiO to amino groups | 377 |
| DC 536 | OH-terminated PDMS w/ aminoethylaminopropyltrimethoxysilane | 350 |
| Wacker F751 | OH-terminated PDMS reaction product w/ aminoethylaminopropyltrimethoxysilane | 342 |
| Genesee GP-6 | Amino functional polydimethylsiloxane with 100:1 ratio Me$_2$SiO to amino groups | 233 |
| Genesee GP-4 | Amino functional polydimethylsiloxane with 58:1 ratio Me$_2$SiO to amino groups | 210 |

Example 3

Samples of Silbrico 3S perlite were treated with the polydimethylsiloxane containing polyether sidechains and/or endcaps, using the procedure described in Example 1. The silicone treated perlite samples were tested to determine the water retention value (WRV), using the procedure described in Example 1. The WRV values for the untreated control perlite and the silicone treated perlites are reported below in Table 5.

TABLE 5

| SILICONE TRADENAME | SILICONE TYPE | WRV |
| --- | --- | --- |
| None | Untreated Silbrico 3S Control | 894 |
| TEGOPREN 5863 | Polydimethylsiloxane with polyether sidechains | 636 |
| TEGOPREN 5830 | Polydimethylsiloxane with polyether endcaps | 593 |
| TEGOPREN 5884 | Polydimethylsiloxane with polyether sidechains | 541 |
| TEGOPREN 7008 | Polydimethylsiloxane with polyether and alkyl sidechains | 520 |

Example 4

Samples of several glass microspheres and perlites were tested to determine the water retention value (WRV), using the procedure described in Example 1. The WRV value for the untreated control perlite, the silicone treated perlites and the microspheres are reported below in Table 6. Samples of all of the perlites were treated with 0.5% Dow Corning 108 (amino functional polydimethyl siloxane) using the procedure described in Example 1 and were tested to determine the water retention value (WRV). The water retention values (WRV) of these samples are shown in Table 6.

TABLE 6

| MATERIAL | WRV (%) |
| --- | --- |
| Silbrico 3S Perlite (Untreated) | 1092 |
| Silbrico 3S Perlite (DC 108 Treated) | 350 |
| Silbrico 30-1 Perlite (Untreated) | 241 |
| Silbrico 30-1 Perlite (DC 108 Treated) | 123 |
| Perlite expanded by USG | 680 |
| Perlite expanded by USG (DC 108 Treated) | 280 |
| 3M K1 Microspheres | 144 |
| 3M K25 Microspheres | 51 |
| PQ Q-Cell 300 Microspheres | 87 |

TABLE 6-continued

| MATERIAL | WRV (%) |
| --- | --- |
| PQ Q-Cell 2116 Microspheres | 96 |

Example 5

Samples of several closed cell perlite products together with a conventional perlite product were tested to determine their water retention values (WRV), using the procedure described in Example 1. The WRV values for the untreated control perlite and the silicone treated closed cell perlites are reported below in Table 7. Samples of all of the perlites were treated with 0.5% Dow Corning 108 (aminofunctional polydimethylsiloxane) using the procedure described in Example 1 and were tested to determine the water retention value (WRV). The water retention values (WRV) of these samples are shown in Table 7.

TABLE 7

| MATERIAL | WRV (%) |
| --- | --- |
| Silbrico 3S Perlite (Untreated) | 1092 |
| Silbrico 3S (DC 108 Treated) | 350 |
| Silbrico 30-1 Perlite (Untreated) | 241 |
| Silbrico 30-1 Perlite (DC 108 Treated) | 123 |
| Silbrico Sil-Cell (Untreated) | 357 |
| Silbrico Sil-Cell (DC 108 Treated) | 106 |
| Grefco Dicaperl ® Perlite (Untreated) | 380 |

Example 6

Samples of Silbrico 3S perlite were treated with various combinations of hydrophobic and hydrophilic silanes using the procedure described in Example 1. The silane treated perlite samples were tested to determine the water retention value (WRV), using the procedure described in Example 1. The WRV values for the untreated control perlite and the silane treated perlites are reported below in Tables 8–10.

TABLE 8

| Hydrophobic Silanes | | |
| --- | --- | --- |
| SILICONE TRADENAME | SILICONE TYPE | WRV |
| None | Untreated Silbrico 3S Control | 1024 |
| Wacker BS 1316 | Isooctyltrimethoxysilane | 316 |
| OSi A-162 | Methyltriethoxysilane | 670 |

TABLE 9

| Hydrophilic Silanes | | |
| --- | --- | --- |
| SILICONE TRADENAME | SILICONE TYPE | WRV |
| None | Untreated Silbrico 3S Control | 617 |
| Dow Corning Z-6076 | Chlorotriethoxysilane | 452 |
| Dow Corning Z-6011 | Aminopropyltriethoxysilane | 756 |
| Dow Corning Z-6020 | N-,beta-aminoethyl-gamma-aminopropyltrimethoxysilane | 555 |
| Dow Corning Z-6040 | 3-Glycidoxytrimethoxysilane | 556 |

TABLE 10

1:1 Mixtures of Hydrophobic and Hydrophilic Silanes

| SILICONE TRADENAME | SILICONE TYPE | WRV |
|---|---|---|
| None | Untreated Silbrico 3S Control | 937 |
| Wacker BS1316 | Isooctyltrimethoxysilane | 430 |
| Dow Corning Z-6076 | Chlorotriethoxysilane | |
| Wacker BS1316 | Isooctyltrimethoxysilane | 485 |
| Dow Corning Z-6020 | N-,beta-aminoethyl-gamma-aminopropyltrimethoxysilane | |
| Wacker BS1316 | Isooctyltrimethoxysilane | 584 |
| Dow Corning Z-6040 | 3-Glycidoxytrimethoxysilane | |

Example 7

Two identical pilot line runs were conducted using untreated Silbrico 3S perlite and using Silbrico 3S perlite treated with 0.5% of a Dow Corning 108 emulsion. The procedure for the silicone treatment of the Silbrico 3S perlite is described in Example 1. The same formula was used for both pilot line runs, and it is presented in Table 11. The Tipple moisture (the moisture content of the board taken immediately prior to the board entering the drying kiln) for each run is presented in Table 12.

TABLE 11

| COMPONENT | DRY WEIGHT (lbs) | DRY PERCENTAGE |
|---|---|---|
| Mineral Wool | 5.1 | 4.92 |
| Perlite | 52.2 | 50.08 |
| Starch | 7.3 | 7.00 |
| Newsprint | 18.8 | 18.00 |
| Gypsum | 20.9 | 20.00 |
| Flocculant | 0.08 | 0.08 |
| TOTAL | 104.38 | 100.08 |

The wet mats were dried in an oven at 600° F. for 30 minutes, and thereafter, the oven temperature was lowered to 350° F. and the tiles were dried for an additional 120 minutes.

After drying, all of the test specimens were cut and subjected to 75° F./50% relative humidity conditions for at least 24 hours prior to testing. The specimens were tested for the density, thickness and modulus of rupture. The results were recorded (results are based on an average of 4 specimens in each set, unless otherwise indicated) and reported in Table 12. The data indicated that in the two pilot line runs, the DC 108 treated perlite and the untreated perlite produced boards having statistically equivalent flexural strength values.

TABLE 12

| Perlite | Untreated | DC108 Treated |
|---|---|---|
| Tipple Moisture (%) | 73.0 | 68.7 |
| Thickness (in.) | 0.585 | 0.573 |
| Density (pounds per cubic foot) | 10.80 | 10.59 |
| MOR (psi) | 84.9 | 78.7 |
| Corrected MOR (psi) | 105.5 | 100.9 |

Based on drying studies detailed below, the Tipple moisture reduction of 4.3 percentage points corresponds to a potential linespeed increase of approximately 18%.

A second series of identical pilot line runs was conducted using untreated Silbrico 3S perlite and using Silbrico 3S perlite treated with 0.5% of a Wacker F751 aminofunctional siloxane. The procedure for the silicone treatment of the Silbrico 3S perlite is described in Example 1. The same formula was used for both pilot line runs, and it is presented in Table 11. The Tipple moisture for each run is presented in Table 13.

TABLE 13

| Perlite | Untreated | Wacker F751 Treated |
|---|---|---|
| Tipple moisture(%) | 73.1 | 65.6 |

For this series of runs, the substitution of silicone treated perlite for untreated perlite affected a reduction of 7.5 percentage points in the tipple moisture. Based on drying studies detailed below, this larger drop in Tipple moisture corresponds to a potential linespeed increase of approximately 31%.

Example 8

Drying studies were conducted to quantify the reduction in drying time associated with the decrease in moisture content caused by the use of a silicone treated perlite. A series of identical Tappi boards was produced using the following lightweight aggregates.

1. Silbrico 3S perlite-untreated
2. Silbrico 3S perlite treated with 0.5% of a Dow Corning amino functional siloxane (DC 108)

Using identical Tappi box procedures presented below, the use of the DC 108 treated perlite caused an average drop in Tipple moisture of 9.9% (71.2% versus 61.3%). Each of these Tappi boards was dried in a special oven in which the weight of the board could be monitored during the drying process. The boards produced using the silicone treated perlite dried on average 25.6% faster than boards made using the untreated perlite. This decrease in drying time represents a potential increase in linespeed of 41.0%. The specific test results are shown below.

Preparation of TAPPI Boards

1. Combine water, mineral wool, starch, gypsum, and newsprint
2. Mix at highest mixer setting for 3.00 minutes.
3. Add perlite and mix sufficiently to achieve a homogeneous mix.
4. Add flocculant; mix for 5 seconds.
5. Set up Tappi box with a piece of nonwoven scrim on top of the wire.
6. Prefill Tappi box with water to just cover the nonwoven scrim.
7. Pour stock into Tappi box.
8. Apply gravity drainage; record time.
9. Apply 5 seconds of 20" Hg vacuum (diminishing vacuum with time).
10. Weight formed mat. Arrange mat between pieces of plastic wire and perforated plate.
11. Transfer to hydraulic press. Press mat to desired thickness. Weigh.
12. Reinsert pressed mat into Tappi box. Apply 5 seconds of 20' Hg vacuum.
13. Transfer mat to carriage for drying study.
14. Oven was preheated to 350° F. Samples were dried at 300° F. until constant weight.

DRYING AT 300° F.

| SAMPLE | Tipple Moisture (%) | % Water Removed | Drying Time (Min) | Potential Linespeed Increase (%) |
|---|---|---|---|---|
| Silbrico 3S - Untreated | 71.8 | 0.0 | 92.1 | 0.0 |
| Silbrico 3S - Untreated | 72.3 | 0.0 | 102.1 | 0.0 |
| DC 108 Treated Silbrico 3S | 59.2 | 44.4 | 68.1 | 42.6 |
| DC 108 Treated Silbrico 3S | 59.9 | 42.8 | 60.4 | 60.8 |

DRYING AT 350° F.

| SAMPLE | Tipple Moisture (%) | % Water Removed | Drying Time (Min) | Potential Linespeed Increase (%) |
|---|---|---|---|---|
| Silbrico 3S - Untreated | 71.5 | 0.0 | 76.7 | 0.0 |
| Silbrico 3S - Untreated | 69.1 | 0.0 | 79.6 | 0.0 |
| DC 108 Treated Silbrico 3S | 62.4 | 30.0 | 60.3 | 29.6 |
| DC 108 Treated Silbrico 3S | 63.7 | 26.0 | 62.8 | 24.4 |

The forms of invention shown and described herein are to be considered only as illustrative. It will be apparent to those skilled in the art that numerous modifications may be made therein without departing from the spirit of the invention and the scope of the appended claims.

I claim:

1. In a composition suitable for making acoustical tiles in a water-felting process, said composition comprising expanded perlite, cellulosic fiber and, optionally, a secondary binder and optionally mineral wool, the improvement comprising said perlite having been treated to reduce its water retention.

2. In the composition described in claim 1, the improvement comprising said perlite having been treated with a silicone compound to reduce its water retention.

3. In the composition described in claim 2, the improvement comprising said perlite having been treated with a silicone compound having some hydrophilic character to increase wettability of said perlite.

4. In the composition described in claim 3, the improvement comprising said perlite having been treated with a silicone selected from the group consisting of amino substituted polydimethylsiloxanes and polyether substituted polydimethylsiloxanes.

5. In the composition described in claim 3, the improvement comprising said perlite having been treated with a combination of hydrophilic and hydrophobic silane materials, said hydrophobic silane materials selected from the group consisting of isooctyltrimethoxysilane and methyltrimethoxysilane, said hydrophilic silane materials selected from the group consisting of amino functional trialkoxysilanes, 3-glycidoxypropyltrimethoxysilane and chloropropyltriethoxysilane.

6. In the composition described in claim 1, said composition comprising up to 75% by weight of expanded perlite, up to 25% by weight cellulosic fiber, from 0 to 15% by weight of starch, from 0 to 10% of latex, from 0 to 25% by weight of filler, and from 0 to 85% by weight of mineral wool.

7. In the composition described in claim 1, said composition comprising 15 to 70% by weight of expanded perlite, 3 to 20% by weight cellulosic fiber, from 3 to 12% by weight of starch, from 0 to 5% of latex, from 0 to 20% by weight of filler and from 5 to 65% by weight of mineral wool.

8. In the composition described in claim 1, said composition comprising about 50% by weight of expanded perlite, about 18% by weight cellulosic fiber, about 7% by weight of starch, about 20% by weight of filler, and about 5% by weight of mineral wool.

9. In the composition described in claim 1, wherein said composition is suitable for making acoustical Fire-Code rated ceiling, said composition comprising up to 70% by weight of expanded perlite, at least 3% by weight of cellulosic fiber, up to 50% by weight of mineral wool, at least 3% by weight of starch, at least 10% by weight of clay.

10. A slurry composition suitable for making acoustical tiles in a water-felting process which includes the steps of dewatering and drying, said slurry composition comprising water, expanded perlite, cellulosic fiber and, optionally, a secondary binder and optionally mineral wool, said perlite having been treated with a silicone compound to reduce its water retention, said slurry having a solids content of at least 30% by weight after dewatering and before drying.

11. A continuous process for making acoustical tiles in a water-felting process which includes the steps of dewatering and drying, said process comprising forming a slurry comprising expanded perlite, cellulosic fiber and, optionally, a secondary binder and optionally mineral wool, with water, said perlite having been treated to reduce its water retention.

12. The continuous process described in claim 11, wherein said perlite has been treated with a silicone compound to reduce its water retention.

13. The continuous process described in claim 12, wherein said perlite has been treated with a silicone compound having some hydrophilic character to increase wettability of said perlite.

14. The continuous process described in claim 13, wherein said perlite has been treated with a silicone selected from the group consisting of amino substituted polydimethylsiloxanes and polyether substituted polydimethylsiloxanes.

15. The continuous process described in claim 13, wherein said perlite has been treated with a combination of hydrophilic and hydrophobic silanes, said hydrophobic silane materials selected from the group consisting of isooctyltrimethoxysilane and methyltrimethoxysilane, said hydrophilic silane materials selected from the group consisting of amino functional trialkoxysilanes, 3-glycidoxypropyltrimethoxysilane and chloropropyltriethoxysilane.

16. The continuous process described in claim 11, wherein said dewatering of said slurry produces a basemat having a solids content of at least 30% by weight before drying.

17. The continuous process described in claim 11, wherein said composition comprises up to 75% by weight of expanded perlite, up to 25% by weight cellulosic fiber, from 0 to 15% by weight of starch, from 0 to 10% of latex, from 0 to 25% by weight of filler and from 0 to 85% by weight of mineral wool.

18. The continuous process described in claim 11, wherein said composition comprises 15 to 70% by weight of expanded perlite, 3 to 20% by weight cellulosic fiber, from 3 to 12% by weight of starch, from 0 to 5% of latex, from 0 to 20% by weight of filler and from 5 to 65% by weight of mineral wool.

19. The continuous process described in claim 11, wherein said composition comprises about 50% by weight of expanded perlite, about 18% by weight cellulosic fiber, about 7% by weight of starch, about 20% by weight of filler, and about 5% by weight of mineral wool.

20. The continuous process as described in claim 11 for making Fire Code rated acoustical tiles, wherein said process comprises forming a slurry by admixing up to 70% by weight of expanded perlite, up to 25% by weight of cellulosic fiber, at least 3.0% starch, up to 50% by weight of mineral wool, and at least 10% by weight of clay with water.

* * * * *